United States Patent
Della Pina et al.

(10) Patent No.: US 7,066,499 B2
(45) Date of Patent: Jun. 27, 2006

(54) PIPE INTEGRAL THREADED JOINT

(75) Inventors: Giuseppe Della Pina, Treviolo (IT); Giuseppe Rotini, Dalmine (IT); Angelo Signorelli, Chiuduno (IT)

(73) Assignee: Dalmine S.p.A. (IT)

( * ) Notice: Subject to any disclaimer, the term of this patent is extended or adjusted under 35 U.S.C. 154(b) by 0 days.

(21) Appl. No.: 10/333,142

(22) PCT Filed: Jul. 16, 2001

(86) PCT No.: PCT/EP01/08188

§ 371 (c)(1),
(2), (4) Date: Jun. 5, 2003

(87) PCT Pub. No.: WO02/06715

PCT Pub. Date: Jan. 24, 2002

(65) Prior Publication Data

US 2004/0021314 A1    Feb. 5, 2004

(51) Int. Cl.
*F16L 25/00*    (2006.01)

(52) U.S. Cl. ..................................... 285/334

(58) Field of Classification Search ............... 285/334, 285/332.4, 333
See application file for complete search history.

(56) References Cited

U.S. PATENT DOCUMENTS

| | | | |
|---|---|---|---|
| 2,992,019 A | 7/1961 | MacArthur | 285/110 |
| 3,870,351 A | 3/1975 | Matsuki | |
| 4,153,283 A | 5/1979 | Hellmund et al. | 285/334 |
| 4,624,488 A | 11/1986 | Furgerson | 285/334 |
| 4,676,529 A | 6/1987 | McDonald | |
| 4,688,832 A * | 8/1987 | Ortloff et al. | 285/334 |
| 4,692,988 A * | 9/1987 | Shulver et al. | 285/334 |
| 4,696,498 A * | 9/1987 | Church | 285/334 |
| 4,728,129 A * | 3/1988 | Morris | 285/334 |
| 4,830,411 A | 5/1989 | Tsuru et al. | 285/334 |
| 4,893,844 A * | 1/1990 | Chelette et al. | 285/334 |
| 4,928,999 A * | 5/1990 | Landriault et al. | 285/334 |
| 4,958,862 A | 9/1990 | Cappelli et al. | 285/334 |

(Continued)

FOREIGN PATENT DOCUMENTS

EP    0454 148 A2    10/1991

(Continued)

OTHER PUBLICATIONS

VAM Brochure, OCTG Division of Vallourec & Mannesmann; "VAM SLIJ-II", p. 6; (Mar. 2000).

(Continued)

*Primary Examiner*—David Bochna
(74) *Attorney, Agent, or Firm*—Fitzpatrick, Cella, Harper & Scinto

(57) ABSTRACT

Pipe integral threaded joint formed by a male element (1) and a female element (2) respectively placed on the external surface and on the internal surface of two truncated cone-shaped parts of the threading (6, 7, 8, 9) having the same conicity value and being radially spaced, both being respectively divided by annular shoulders (5, 5') which are parallel and orthogonal with respect to the pipe axis. They are provided two sealing surfaces (12, 12', 13, 13'), one of them being cone-shaped and the other being spherical. After the screwing of the two elements (1, 2) said two annular shoulders (5, 5') are in contact. Each male (1) and female (2) element comprises, respectively along its external and internal surface, a circumference cavity (14, 15) placed between a part of the threading and the annular shoulder (5, 5') in order to allow the expansion of the lubricating fat.

10 Claims, 2 Drawing Sheets

U.S. PATENT DOCUMENTS

| | | | |
|---|---|---|---|
| 4,984,829 A | 1/1991 | Saigo et al. ................. | 285/334 |
| 5,066,052 A | 11/1991 | Read ........................... | 285/334 |
| 5,462,315 A | 10/1995 | Klementich | |
| 5,649,725 A | 7/1997 | Nagasaku et al. ........... | 285/334 |
| 6,347,814 B1 * | 2/2002 | Cerruti ....................... | 285/334 |

FOREIGN PATENT DOCUMENTS

| | | |
|---|---|---|
| EP | 0767335 A1 | 4/1997 |
| EP | 0916883 A1 | 5/1999 |
| GB | 1220856 | 1/1971 |
| WO | WO 93/18329 | 9/1993 |

OTHER PUBLICATIONS

Tsuru, et al., "Influence of Compound Grease on the Perfromance of Premium Connections", Society of Petroleum Engineers, Copyright 1990, p. 8.

VAM Premium Connections Presentation to Total Premier Services; pp. 1-17; (May 2000).

VAM SLIJ-II, Connection Data Sheet for P-110; p. 3; (Mar. 2000).

VAM SLIJ II Connection Data Sheets for K-55; p. 3; (Aug. 1999).

* cited by examiner

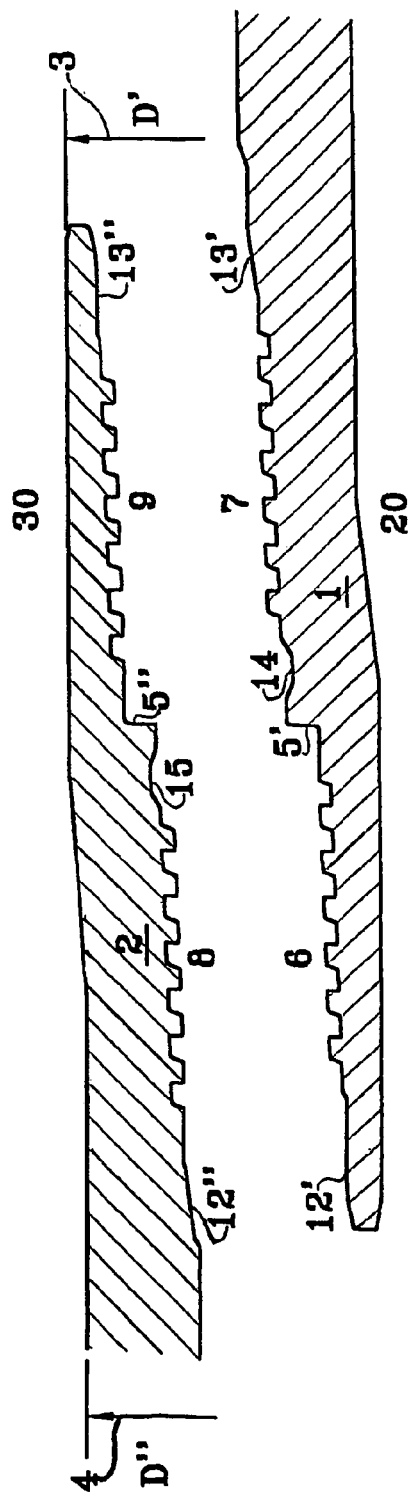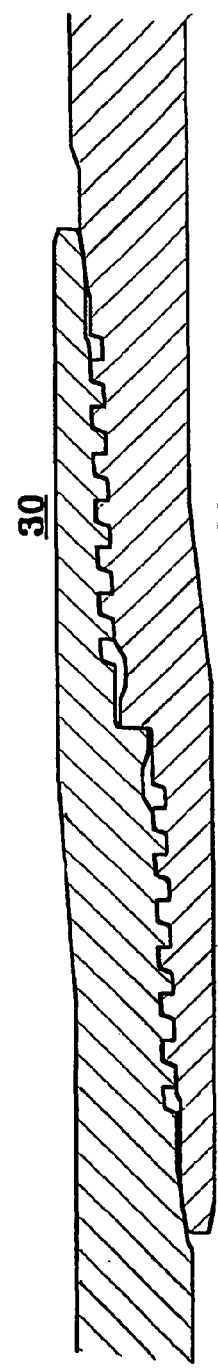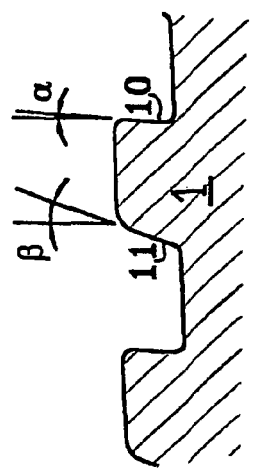

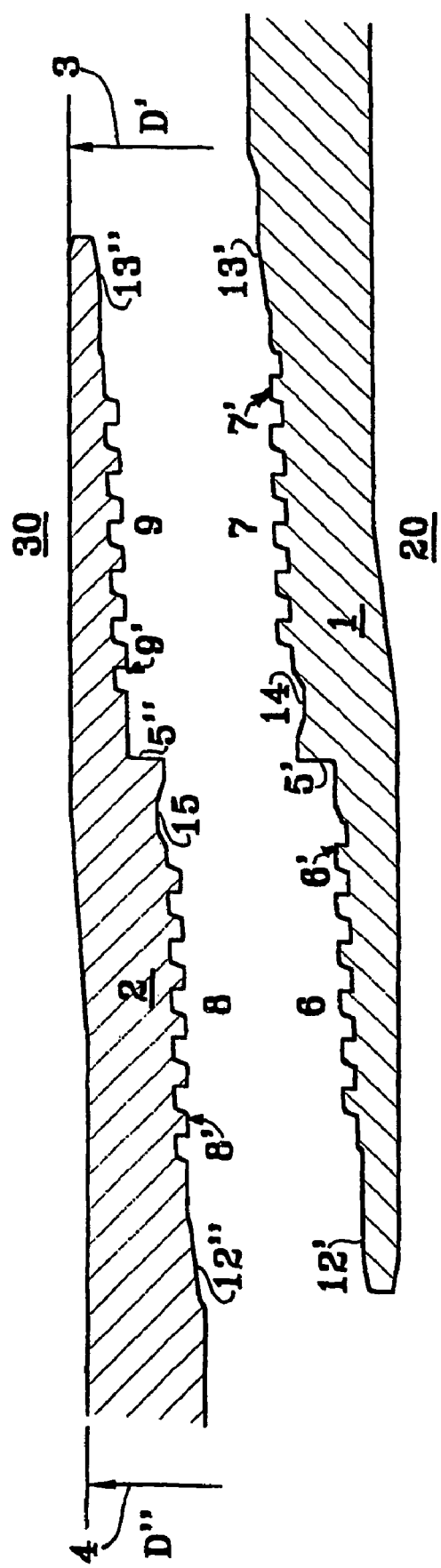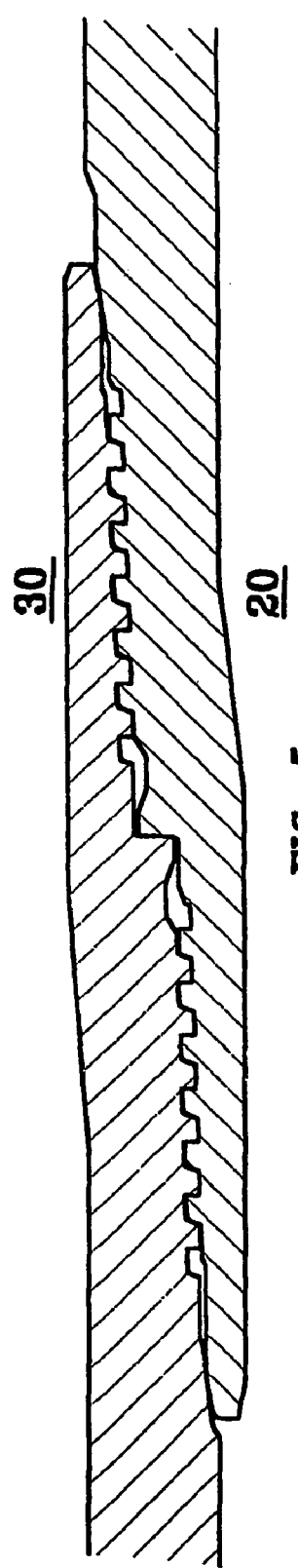

PIPE INTEGRAL THREADED JOINT

FIELD OF THE INVENTION

The present invention concerns a pipe integral threaded joint having reduced diametrical dimensions, in particular for pipes employed in the gas or oil fields exploit industry. Said pipes can be used both as ducts for pumping the gas or the oil and as a coating for the wells.

TECHNICAL BACKGROUND

The natural gas and oil exploit industry employs pipes having a fixed length which must be connected to each other's ends in order to reach the huge depths where hydrocarbon mines are generally located.

In the most commonly employed drilling technique, wells starting from the earth or the sea surface are drilled in order to reach the oil or gas field. Said wells can have a depth of several thousands meters. During drilling, said wells are coated inside with metal pipes for their entire length. The segments of metal pipe, which have a length of about 10 metres, are connected to each other by means of threaded joints. Therefore, these pipes form a tubular line, having the same diameter for its entire length but in the joints, whose external diameter is generally at least 1 inch (25.4 mm) bigger than the one of the line.

In order to form a coating for the entire depth of the well several lines are used having, due to mechanical resistance and to the geological characteristics of the site, the smaller diameter the bigger is the depth of the line, in order to form a "telescopic" structure. It follows that, since the diameter at the bottom of the well varies according to the pressure and the flow of the fluids to be extracted, the deeper the well, the bigger its diameter will be on the surface. As unfavourable consequence of the aforesaid, the drilling cost is high and, furthermore, these well coatings require a large amount of material, thus being very expensive. A smaller well diameter also means shorter drilling and coating times. Therefore, it is essential to minimize the well diameter and the coating pipe diameter with an equal amount of extracted fluids.

Once ended the drilling, inside the coated well it is inserted another tubular line, which must pump the gas or the oil out of the underground field. This line, which follows the entire depth of the well and can therefore reach a length of several thousands metres, is also formed by connecting pipes having a length of about 10 metres by means of the aforesaid joints. Usually, also this second kind of line has the same diameter for its entire length but in the joints, whose external diameter is generally bigger, as it happens in the previous case.

In both the aforesaid cases, the pipes are connected by means of threaded joints, which can be integral, and in this case an end of the pipe has a male threading and the other has a female threading, or can be of a coupling type, and in this case both ends of the pipe have a male threading, being connected by means of a female threaded coupling on both sides. Usually, the presence of the joint involves an increase of the external diameter of the line where the joints are; the bigger the external diameter of the joint if compared to the pipe, the bigger are the general dimensions of the line and the bore.

After the oil companies have required to minimize the oil and gas mining costs, remarkable efforts were carried out in order to reduce the diameter of the wells and therefore the diameter of the pipes.

In order to reduce the external diameter of the line and therefore the drilling costs and the amount of required material, they are used threaded joints having reduced diametrical dimensions, which can be divided into three different types, according to the performance required and to the maximum dimensions allowed. A first type, which is often called "semi-flush", is a coupling joint whose external diameter does not exceed over 6% the pipe external diameter. A second type, usually called "near-flush", is an integral joint whose external diameter is about 2–3% larger than the pipe external diameter. A last type, called "flush", is an integral joint whose external diameter corresponds to the pipe external diameter.

The choice among the different types of joints depends on the load on the pipe line, the pressure acting internally and/or externally, its length and its maximum diametrical dimensions allowed with regard to the diameter of the well.

If the joint diameter is reduced it is necessary to find new solutions able to compensate for the lower structural resistance. In fact, in the parts close to the joints the efficacy is necessarily less than in the pipe, because the structural elements such as the threading, the seals and the shoulders are placed in the thickness of the pipe wall and this involves a reduced section in the critical parts of the male or female element.

A minimization of the pipe breaking causes is essential because said breaks, above all after the pipes have been laid in the underground, and it is therefore nearly impossible for the operators to replace a broken joint, can have extremely serious economical consequences and can cause environmental problems, particularly if the oil or gas field contains aggressive elements.

Therefore, in the past much has been done to improve joints and to reach an optimal efficacy level, balancing the different needs, which are sometimes in contrast among them, of minimum dimensions, maximum structural resistance and tightness against the output and/or input-of the fluids. In fact, the pipes undergo several forces, namely compression, traction, flexion and the pressure produced by external fluids and/or by fluids circulating inside the pipes.

The joints must also have an optimal resistance to screwing and seizing. Structural and sealing problems are often worsened by the fluid temperature, by their corrosiveness or by the environmental conditions of the digging areas. In the past several solutions have been proposed in order to satisfy the aforesaid conditions.

The international patent application WO-A-93/18329 concerns a joint with reduced diametrical dimensions having a central shoulder. Said shoulder is provided, both on the male element and on the female element, with a projection and a cavity which are parallel to the pipe axis, having homologous surfaces to be coupled in order to block the two joint elements. On the shoulder projections two sealing surfaces are provided. The shoulder divides two radially offset threading parts, which are cone-shaped or cone-shaped and cylindrical.

This joint is very efficient, but has a particularly complex structure involving very high production costs.

The European patent application EP-A-767335 concerns a joint with reduced diametrical dimensions provided with a central shoulder and two metal seals placed on the end of the male and the female elements. The shoulder divides two radially offset threading parts which are cone-shaped and cylindrical.

This joint's structure is simpler than the previous one, but it is always relatively complex because of the cone-shaped, cylindrical threading. Furthermore, the two seals at the ends of the joints hermetically seal its inside, thus pressurizing the lubricating fat for the screwing, with possible negative effects on the joint tightness.

SUMMARY OF THE INVENTION

A first object of the present invention is to overcome the aforesaid drawbacks of the prior art joints by means of a new "near-flush" joint which, though having the same dimensions of the prior art joints, does not involve the aforesaid problems. It is a particular object of the present invention to provide for an integral joint having reduced diametrical dimensions and lower production costs, though ensuring high resistance and operational tightness.

A further object of the present invention is to provide an embodiment of this joint which simplifies its installation.

These objects are achieved by a pipe integral joint which, according to claim 1, comprises a male element whose external surface is provided with two radially spaced, truncated cone-shaped threaded portions, said two portions being divided is by a first annular shoulder lying on a plane orthogonal to the pipe axis and a female element whose internal surface is provided with two radially spaced, truncated cone-shaped threaded portions, said two portions being divided by a second annular shoulder lying on a plane orthogonal to the pipe axis, each of said male and female elements being provided with two sealing surfaces respectively placed on the opposite ends with respect to the threaded portions, said respective two threaded portions being able to mutually and reversibly screw one inside the other in order to produce a contact between said two annular shoulders, characterized in that the corresponding two threaded portions of each male and female element have the same conicity value and in that a first one of said respective two sealing surfaces of said male and female elements has a conical and a second one has a spherical shape.

Thanks to this embodiment, the joint allows an easy installation of the pipe line, with a reduced risk of damage of the joints, though ensuring an optimal resistance of the pipe line at the joints.

Preferred embodiments of the present invention are described in detail in the dependent claims.

BRIEF DESCRIPTION OF THE DRAWINGS

Further features and advantages of the present invention will become apparent by means of the following detailed description of a preferred but not exclusive embodiment of an integral joint, given as a non limitative example, with reference to the following drawings, wherein:

FIG. 1 shows a cross-section along an axial plane of the joint according to the invention, with the two elements in a detached position;

FIG. 2 shows the joint of FIG. 1 with the two elements in an assembled position;

FIG. 3 shows an enlarged view of a detail of the joint threading of FIG. 1;

FIG. 4 shows a cross-section along an axial plane of another embodiment of the joint according to the invention, with the two elements in a detached position;

FIG. 5 shows the joint of FIG. 4 with the two elements in an assembled position.

DETAILED DESCRIPTION OF THE INVENTION

With a reference to the aforesaid figures, the joint according to the present invention comprises two elements or pipes, namely the male element 1 and the female element 2. The joint is formed by an internal part 20 wherein the fluids flow, for example natural gas or oil or another analogous fluid under pressure, and an external part 30 which can also be filled with different fluids or liquids, usually also pressurized. The external diameter 3 of pipe 2 in the joint area having the maximum diameter with a dimension D' is slightly larger than the external diameter 4 of pipe 2 in the central area far away from the joint, with a dimension D". The two aforesaid pipe areas having different diameters 3 and 4 are connected in a gradual way. Dimension D' is larger than dimension D" of a value equal to or smaller than 3%.

The female element 2 of the joint has an internal threading divided into two portions, or steps, 8 and 9 with a conical generatrix at an angle to the pipe axis. Said two parts 8 and 9 are radially offset and the threading can be perfect for its entire length or can have an imperfect portion. Said embodiment is shown in FIGS. 1 and 2.

In another embodiment of the present invention shown in FIGS. 4 and 5, the threading portions 7 and 8 can respectively have ends with an imperfect threading.

Said two portions 8 and 9 have the same conicity, with values comprised between 6.25 and 12.5%. This range turned out to be optimal, because on the one hand lower values would involve too long threadings and a difficult coupling, and on the other end higher values would involve a reduced number of teeth and therefore an insufficient bearing capacity of the threading.

In the connecting area between the threaded part and the internal surface of the pipe, away from the joint, the female element is provided with an area 12" having a cone-shaped surface with respect to the pipe axis. The conicity of this surface is comprised between 12.5% and 25% in order to ensure a good tightness with the corresponding contacting surface of the male element, thus reducing the sliding time during the screwing step.

This range turned out to be optimal with respect to the threading conicity value and was able to reduce the negative influence of traction loads. In the connecting area between the two threaded portions 8, 9, the female element is provided with a shoulder 5" substantially lying on a perpendicular plane with respect to the joint axis, whose area is not less than 25% of the area of the section of the pipe. Between the shoulder 5" and the beginning of the threaded part 8 there is provided a cavity 15 which extends along the whole internal circumference of the female element 2. The cavity ensures an expansion tank for the fat used to lubricate the joint, which is present in the two threaded portions 8, 9 and is entrained by the push generated by the sliding of the elements 1 and 2 during the screwing. Said solution limits the development of an excessive fat pressure, caused by the presence of a double metal seal at the ends of the joint, with a following reduced stress of the joint.

At its end the female element 2 is provided with a spherical surface 13" which, contacting a cone-shaped area 13' which it faces after its screwing with the male element 1, ensures the tightness of the joint to the external pressure.

The threading tooth profile is of the "hooked" type, with a loading flank 10 having a negative α angle with values comprised between 0 and −10° and an entering flank 11 having a positive β angle with values comprised between 10 and 30°. These ranges of values have remarkable advantages though maintaining an easy installation of the joint. A loading flank with negative angle allows an efficient coupling of the two elements of the joint and reduces the danger of a possible withdrawal of the joint because of too high traction loads. An entering flank with positive but not too large angle allows an efficient co-operation of the threading to the resistance to compression loads.

In the area of the external surface close to the threaded portion of the female element, the male element 1 is provided with a threading placed in a perfectly reciprocal way, having portions shaped in an exactly analogous way with respect to said threading portion of the female element.

The element 1 is provided with two threaded portions 6, 7 separated by a shoulder 5' and by a circumference cavity 14, between said shoulder 5' and the beginning of the threaded portion 7. The presence of the two fat expansion cavities 14 and 15 allows to limit the pressure increase of the fat after the screwing of the joint, thus avoiding an excessive stress on the joint and improving its functionality.

The connecting area between the external surface of element 1 and the beginning of the threaded portion 7 has a cone-shaped surface 13' with a conicity comprised between 12.5 and 25%. This surface exerts pressure against the surface 13" after the screwing of the joint and the dimensions and tolerances are selected so that the metal-metal contact guarantees the necessary tightness to avoid the entering of the liquid or fluid under pressure outside the joint.

Analogously, at its end, the male element I has a spherical surface 12' which, after the screwing with the female element 2, exerts pressure against the conical surface 12' of said female element. Also in this second area a pressure is generated by the metal-metal contact between the two elements which ensures the necessary tightness against the pressure of the fluid inside the pipe. The choice of two areas at the ends of the joint where metal seals are provided which have, respectively, corresponding spherical and conical surfaces, according to the invention, makes the joint less sensitive to pressure loads and turned out to be optimal for thin pipes. In fact, considering the slimness of the ends provided with the sealing surfaces 12' and 13', the pressure, respectively internal or external to the pipe, acting on the aforesaid ends easily causes their bending. Therefore, a spherical sealing surface is able to keep an optimal contact, unlike a truncated cone-shaped seal, which, in this case, because of the rotation imposed by the bending of the end, does not keep the contact on the whole sealing part. The shape of the thread of the male element 1 is the same as the aforesaid one of the female element 2. Advantageously, the thread has a perfect profile.

In the other embodiment according to the present invention and shown in FIGS. 4 and 5, an end of one or two of both threaded portions 6, 7 of the male element, for example the area 6' close to the shoulder 5', can have a thread with an imperfect profile. The corresponding part 8 of the female element on the side of the shoulder 5" facing area 6" has a perfect threading. The area 8' at the end of the threaded portion 8 axially opposite to the area 6', namely the one close to the sealing surface 12", also has a thread with an imperfect profile. However, this area can also be provided with a perfect thread.

The same kind of proceeding can also be applied to the threaded portions 7 and 9, wherein portion 7 is provided with a perfect thread on the side of shoulder 5' and part 9 is provided with an area 9' having an imperfect thread on the side of shoulder 5". In combination or alternatively to this embodiment, also part 7 can be provided with an area 7' having an imperfect thread on the side of the sealing surface 13' and part 9 can be provided with a perfect thread on the side of the sealing surface 13".

From the aforesaid it is clear which are the advantages of the joint according to the present invention, which, though having diametrical dimensions smaller than those of the "semi-flush" type of the prior art and only slightly larger than those of the "flush" type, ensures optimal performances and working efficiency.

The invention claimed is:

1. Pipe integral near-flush threaded joint comprising:
   a first pipe wall with an outer diameter (D") comprising a male element (1) provided on an external surface portion with a first pair of radially spaced, truncated cone-shaped threaded portions (6, 7) with teeth having a trapezoidal profile, said first pair of threaded portions (6, 7) being divided by a first annular shoulder (5') lying on a plane orthogonal to the pipe axis, and
   a second pipe wall with an outer diameter (D") comprising a female element (2) provided on an internal surface portion with a second pair of radially spaced, truncated cone-shaped threaded portions (8, 9), said second pair of threaded portions being divided by a second annular shoulder (5") lying on a plane orthogonal to the pipe axis,
   the first and second pairs of threaded portions (6, 7, 8, 9) having the same conicity value and being adapted to screw mutually and reversibly one inside the other in order to produce a contact between said first and second annular shoulders (5', 5") in an assembled position,
   the first annular shoulder (5') and the second annular shoulder (5") having the shape of an annulus, lying on a plane for its entirety without presenting any elevation from the plane,
   each of said male (1) and female (2) elements being provided with two metal-metal sealing surfaces (12', 13', 12", 13"), respectively placed at each axial end of the first and second pairs of threaded portions (6, 7, 8, 9),
   wherein a first one of said respective two metal-metal sealing surfaces (12', 13', 12", 13") has a conical shape and a second one has a spherical shape and in that the area of the surfaces of the first and second annular shoulders (5', 5") each are equal to or greater than 25% of a cross-section area of said pipe walls lying on a plane orthogonal to the pipe axis and
   wherein at least one of said male (1) and female (2) elements comprises along its entire surface a circumferential cavity (14, 15) between one of its respective pairs of threaded portions and the respective annular shoulder (5', 5"), the circumferential cavity (14, 15) being adapted to receive the expansion of any lubricating grease applied to threaded portions of the joint.

2. Joint according to claim 1, wherein both the male (1) and female (2) elements comprise, along their entire surface, the circumferential cavity (14, 15), placed between one of the pairs of threaded portions and the respective annular shoulder (5', 5").

3. Joint according to claim 2, wherein an outer diameter dimension (D') of said female element (2) at a first predetermined distance along the joint portion is larger than the dimension (D") of the second pipe wall, which comprises that female element (2) as a joint portion, by a value equal to or smaller than 3%.

4. Joint according to claim 3, wherein said corresponding pairs of threaded portions (6, 7, 8, 9) of said male (1) and female (2) elements each have the same conicity value, comprised between 6.25 and 12.5%.

5. Joint according to claim 4, wherein said corresponding conical sealing surfaces (13', 12") of said male (1) and female (2) elements have a conicity value comprised between 12.5% and 25%.

6. Joint according to claim 5, wherein the profile of the threading teeth has a loading flank (10) with a negative ($\alpha$) angle and an stabbing flank (11) with a positive ($\beta$) angle.

7. Joint according to claim 6, wherein said negative ($\alpha$) angle has a value comprised between 0 and 10 and said positive ($\beta$) angle has a value comprised between 10 and 30.

8. Joint according to claim 7, wherein the shape of said corresponding threaded portions (6, 7, 8, 9) of each of the male (1) and female (2) elements are identical to provide a perfectly mated thread for its entire length.

9. Joint according to claim 7, wherein at least one of said threaded portions (6, 7, 8, 9) of at least one of the male (1) or female (2) elements is provided with a first area (6', 7') having a shape different from the shapes of the corresponding first areas of the other threaded portions, thereby preventing a perfectly mated thread with the other threaded portions.

10. Joint according to claim 9, wherein the corresponding threaded portion of the other of said at least one of male (1) and female (2) elements is also provided with a second area (8', 9') placed at the axially opposite end with respect to said first area with the second area having a shape different from the shapes of the corresponding second areas of the other threaded portions, thereby preventing a perfectly mated thread with the other threaded portions.

* * * * *